United States Patent Office 3,046,191
Patented July 24, 1962

3,046,191
3,4-METHYLENEDIOXYPHENYL ACETALS AS SYNERGISTS FOR PYRETHRINS
Morton Beroza, Greenbelt, Md., assignor to the United States of America as represented by the Secretary of Agriculture
No Drawing. Original application June 15, 1955, Ser. No. 515,798, now Patent No. 2,832,792, dated Apr. 29, 1958. Divided and this application Feb. 28, 1958, Ser. No. 718,384
2 Claims. (Cl. 167—33)
(Granted under Title 35, U.S. Code (1952), sec. 266)

A non-exclusive, irrevocable, royalty-free license in the invention herein described, throughout the world for all purposes of the United States Government, with the power to grant sublicenses for such purposes, is hereby granted to the Government of the United States of America.

This application is a division of application bearing Serial No. 515,798, filed June 15, 1955, now Patent No. 2,832,792.

This invention relates to insecticidal compositions containing pyrethrins or pyrethrin-type compounds and certain 3,4-methylenedioxyphenyl acetals as synergists therefor.

Pyrethrins and pyrethrin-type compounds, such as allethrin, are very useful due to their quick paralyzing or knockdown action on flies, gnats, mosquitoes, and the like. In use, they are generally mixed with inert carriers in low concentrations because of their high cost. In many cases a synergist is added. Such synergists have little or no insecticidal property in themselves but increase the action of the pyrethrins or pyrethrin-type compounds and thereby effect a saving in the use of these expensive materials.

According to the invention, there are provided 3,4-methylenedioxyphenyl acetals having the general formula

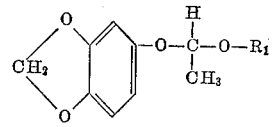

wherein Z is a radical selected from the group consisting of

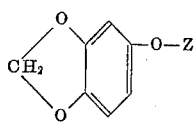

or

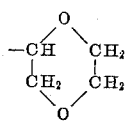

forming heterocyclic-type acetals, or —CH(CH₃)OR₁ in which R₁ is a member selected from the group consisting of alkoxyethyl and alkoxyethoxyethyl radicals wherein the alkoxy group contains 1 to 4 carbon atoms, such as 2-methoxyethyl, 2-n-butoxyethyl, 2-(2-ethoxyethoxy)ethyl, and 2-(2-n-butoxyethoxy)ethyl, and a chloroethyl radical, such as 2-chloroethyl.

Most of these acetals are prepared from vinyl ethers by the following method:

Any peroxides in the vinyl ether, as, for example, those which might have formed in the ether upon standing in light, are first destroyed with an alkaline reducing agent, such as sodium sulfite. The ether is then distilled to remove any stabilizer which may be present therein, as, for example, di-2-ethylhexylamine. A small drop of a mineral acid catalyst such as concentrated hydrochloric acid is then added to about 0.025 mole or more of the distilled vinyl ether, and, while magnetically stirring the solution rapidly, 0.02 mole of sesamol is added thereto in small portions, allowing each portion to dissolve before the next addition, this total addition requiring from 10 to 15 minutes. The addition of the vinyl ether to sesamol plus acid gives resins. The solution is then heated for about 30 minutes at 70° C., or allowed to stand for several hours. To the resulting solution is then added 75 ml. ether and it is then washed twice with 10–20 ml. portions of 0.5 N potassium hydroxide to remove unreacted sesamol and acid, then with water, and twice with saturated salt solution, all washings being discarded. The ether solution is dried over sodium sulfate, filtered, evaporated, and distilled. Yields were usually 90% or better except for the p-dioxane compound which yielded only 35%.

The foregoing procedure was satisfactorily employed to produce acetals of the formula

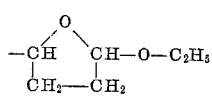

wherein R₁ is 2-methoxyethyl, 2-n-butoxyethyl, 2-(2-ethoxyethoxy)ethyl, and 2-chloroethyl, by reacting the corresponding vinyl ether with sesamol. The compound, 2-(3,4-methylenedioxyphenoxy)dioxane was similarly prepared from p-dioxene and sesamol.

2-(2-butoxyethoxy)ethyl 3,4-methylenedioxyphenyl acetal was prepared by adding 1.5 grams of 2-chloroethyl 3,4-methylenedioxyphenyl acetal to a solution of 0.2 gram sodium in 4 grams of 2-n-butoxyethanol. After heating for 2½ hours at 160° in a sealed tube, the product was taken up in ether and worked up in the same manner as the acetals prepared from the vinyl ethers.

2-ethoxy-5-(3,4-methylenedioxyphenoxy)tetrahydrofuran is prepared by adding a small drop of concentrated hydrochloric acid to 0.025 mole of 2,5-diethoxytetrahydrofuran maintained at 80° while dry nitrogen stirs the solution. To the solution is gradually added 0.02 mole of sesamol and the solution maintained at 80° for an additional 2½ hours. It is then cooled, ether added, and worked up in the same manner as the acetals prepared from the vinyl ethers.

The preparation and some of the properties, of the foregoing compounds are summarized and tabulated as Examples 1 to 7, inclusive, in the following Table I:

Table I

| Ex. No. | 3,4-Methylenedioxyphenyl acetal where $R_1$ is— | Empirical formula | Carbon Calcd. | Carbon Found | Hydrogen Calcd. | Hydrogen Found | Refr. index $n_D^{25}$ or m.p. (corr.) °C. | Prepared from sesamol plus— |
|---|---|---|---|---|---|---|---|---|
| 1 | 2-methoxyethyl | $C_{12}H_{16}O_5$ | 60.0 | 59.74 | 6.71 | 6.56 | 1.5058 | 2-methoxyethyl vinyl ether. |
| 2 | 2-n-butoxyethyl | $C_{15}H_{22}O_5$ | 63.8 | 63.58 | 7.85 | 7.77 | 1.4940 | 2-butoxyethyl vinyl ether. |
| 3 | 2-(2-ethoxyethoxy)ethyl | $C_{15}H_{22}O_6$ | 60.3 | 60.35 | 7.43 | 7.17 | 1.4938 | 2-(2-ethoxyethoxy)ethyl vinyl ether. |
| 4 | 2-(2-n-butoxyethoxy)ethyl | $C_{17}H_{26}O_6$ | 62.6 | 62.95 | 8.03 | 7.92 | 1.4908 | See method in text. |
| 5 | 2-chloroethyl | $C_{11}H_{13}O_4Cl$ | 54.0 | 53.80 | 5.35 | 5.19 | 1.5236 | 2-chloroethyl vinyl ether. |
| 6 | Heterocyclic-type acetal: 2-(3,4-methylenedioxyphenoxy)dioxane. | $C_{11}H_{12}O_5$ | 58.9 | 58.67 | 5.39 | 5.19 | [1] 75.5–76.5 | p-dioxene. |
| 7 | 2-ethoxy-5-(3,4-methylenedioxyphenoxy) tetrahydrofuran. | $C_{13}H_{16}O_5$ | 61.9 | 62.20 | 6.40 | 6.15 | 1.5185 | 2,5-diethoxytetrahydrofuran. |

[1] From ether.

I have found further that the acetals of this invention act as synergists for pyrethrins and pyrethrin-type compounds such as allethrin. The synergistic results obtained with some of these acetals are shown in the data in the following Table II, the examples being numbered therein to correspond with the example numbers of Table I.

In the entomological procedure on which these data are based, the turntable method was employed, 100 houseflies per test being used, and in the pyrethrins and allethrin test solutions used against the houseflies refined kerosene was used as the common solvent for the synergist and the respective pyrethrins and allethrin, acetone being added when necessary to increase the solubility of the synergist.

The pyrethrins test solutions each contained a total of 10 mg. of synergist and 1 mg. of pyrethrins per ml. of solvent and the allethrin test solutions each contained a total of 5 mg. of synergist and .5 mg. of allethrin per ml. of solvent. The percent mortality of houseflies in 24 hours using these test solutions is listed in Table II.

As controls, the 3,4-methylenedioxyphenyl acetal when used alone at 10 mg. per ml. of solvent, that is, without added pyrethrins or allethrin gave a low mortality, usually below 3%, after 24 hours. Pyrethrins alone, that is, without added synergist, gave the following mortalities in 24 hours at the recited concentrations in mg. per ml. of solvent.

Concentration: Percent mortality
1.5 _____ 43
2.3 _____ 56
3.4 _____ 67
5.1 _____ 84
7.6 _____ 96

Allethrin alone, that is, without added synergist, gave the following mortalities of houseflies in 24 hours, at the recited concentration in mg. per ml. of solvent:

Concentration: Percent mortality
.39 _____ 39
.59 _____ 52
.84 _____ 82
1.3 _____ 94
2.0 _____ 95

Table II

| Ex. No. | 3,4-Methylenedioxyphenyl acetal wherein $R_1$ is— | Percent Mortality Pyrethrins Test Solution | Percent Mortality Allethrin Test Solution |
|---|---|---|---|
| 2 | 2-n-butoxyethyl | 99 | 99 |
| 3 | 2-(2-ethoxyethoxy) ethyl | 100 | 100 |
| 4 | 2-(2-n-butoxyethoxy) ethyl | 100 | 100 |
| 5 | 2-chloroethyl | 90 | 93 |
| 6 | Heterocyclic type acetals: 2-(3,4-methylenedioxyphenoxy) dioxane | 100 | 97 |
| 7 | 2-ethoxy-5-(3,4-methylenedioxyphenoxy) tetrahydrofuran | 100 | 98 |

The proportions of 3,4-methylenedioxyphenyl acetals and the pyrethrins and the pyrethrin-type compounds may be varied over a wide range. The preferred ranges, however, are from 0.15 to 2.0 mg. pyrethrins or pyrethrin-type compound per ml. of solvent with from 1.0 to 20 mg. of the 3,4-methylenedioxyphenyl acetal per ml. of solvent.

The compositions may be formulated with other conventional materials commonly used in the insecticidal art, such as carriers, toxic materials and other additives.

What is claimed is:
1. An insecticide comprising a member selected from the group consisting of pyrethrins and allethrin and 2-(3,4-methylenedioxyphenoxy)dioxane having the formula

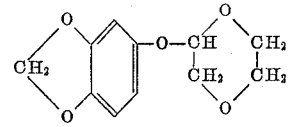

as a synergist therefor.

2. An insecticide comprising a member selected from the group consisting of pyrethrins and allethrin and 2 - ethoxy - 5 - (3,4 - methylenedioxyphenoxy)tetrahydrofuran having the formula

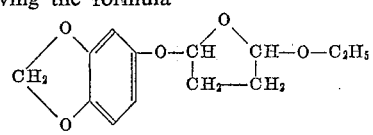

as a synergist therefor.

References Cited in the file of this patent
UNITED STATES PATENTS 2,764,517    Beroza _____ Sept. 25, 1956
2,832,792    Beroza _____ Apr. 29, 1958